United States Patent
Uenoyama et al.

(10) Patent No.: US 9,416,737 B2
(45) Date of Patent: Aug. 16, 2016

(54) BOAT PROPULSION DEVICE AND FLOAT POSITION DETERMINING METHOD

(71) Applicant: YAMAHA HATSUDOKI KABUSHIKI KAISHA, Iwata-shi, Shizuoka (JP)

(72) Inventors: Masashi Uenoyama, Shizuoka (JP); Ryotaro Yasumura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 107 days.

(21) Appl. No.: 14/510,255

(22) Filed: Oct. 9, 2014

(65) Prior Publication Data
US 2015/0204256 A1    Jul. 23, 2015

(30) Foreign Application Priority Data
Jan. 23, 2014  (JP) .................. 2014-010502

(51) Int. Cl.
| | |
|---|---|
| *F02D 29/02* | (2006.01) |
| *F02D 31/00* | (2006.01) |
| *F01N 3/00* | (2006.01) |
| *B63H 21/21* | (2006.01) |
| B63H 20/00 | (2006.01) |
| B60K 15/03 | (2006.01) |
| F02D 41/02 | (2006.01) |
| B63H 21/38 | (2006.01) |

(52) U.S. Cl.
CPC ............... *F02D 29/02* (2013.01); *B63H 21/21* (2013.01); *F01N 3/00* (2013.01); *F02D 31/001* (2013.01); *B60K 2015/03217* (2013.01); *B63H 20/001* (2013.01); *B63H 21/38* (2013.01); *F02D 41/021* (2013.01); *F02D 2041/0265* (2013.01)

(58) Field of Classification Search
CPC .......... F01N 3/20; F02D 41/22; F02M 37/00; B63H 20/00; B63H 21/38; B63H 20/001; B63H 21/14; B63H 21/21
See application file for complete search history.

(56) References Cited

U.S. PATENT DOCUMENTS

| | | | |
|---|---|---|---|
| 8,142,246 B2 * | 3/2012 | Kadobayashi | F02M 37/0088 440/88 F |
| 2011/0223819 A1 | 9/2011 | Kazuta | |

FOREIGN PATENT DOCUMENTS

JP        2011-190704 A        9/2011

* cited by examiner

*Primary Examiner* — Jelani Smith
(74) *Attorney, Agent, or Firm* — Keating and Bennett, LLP

(57) ABSTRACT

A boat propulsion device is configured to be attachable to a vessel body including an external tank. The boat propulsion device includes an engine, an exhaust pipe, a catalyst, an internal tank, a detection unit and a control unit. The exhaust pipe is connected to the engine. The catalyst is disposed in the exhaust pipe. The internal tank communicates with the external tank. The internal tank is configured to store a fuel to be supplied to the engine. The detection unit is configured to detect whether or not an amount of fuel remaining within the internal tank is less than or equal to a predetermined remaining amount. The control unit is configured or programmed to perform a rotation speed reduction control to reduce a rotation speed of the engine when the detection unit has detected that the amount of fuel remaining within the internal tank had become less than or equal to the predetermined remaining amount. The predetermined remaining amount is an amount of fuel necessary to drive the engine until a temperature of the catalyst becomes lower than an ignition temperature of the fuel under the rotation speed reduction control.

12 Claims, 4 Drawing Sheets

BOAT PROPULSION DEVICE AND FLOAT POSITION DETERMINING METHOD

CROSS-REFERENCE TO RELATED APPLICATIONS

This application claims priority under 35 U.S.C. §119 to Japanese Patent Application No. 2014-10502, filed on Jan. 23, 2014. The entire disclosure of Japanese Patent Application No. 2014-10502 is hereby incorporated herein by reference.

BACKGROUND OF THE INVENTION

1. Field of the Invention

The present invention relates to a boat propulsion device including a catalyst, and relates to a float position determining method.

2. Description of the Related Art

A boat propulsion device, including a catalyst disposed inside an exhaust pipe, is known (e.g., see Japan Laid-open Patent Application Publication No. JP-A-2011-190704). Such a boat propulsion device includes an internal tank and a fuel injection device. The internal tank temporarily stores a fuel transferred thereto from an external tank mounted to a vessel body. The fuel injection device is configured to inject the fuel stored in the internal tank into an engine.

However, the boat propulsion device described in JP-A-2011-190704 is configured such that an air-fuel ratio within a cylinder enters an over-lean state and a misfire is caused when a fuel shortage is caused in the internal tank in accordance with a fuel shortage in the external tank. In this case, if the fuel, leaking out of the engine to the exhaust pipe, ignites by making contact with a high-temperature catalyst, and thereby, the catalyst might be overheated.

SUMMARY OF THE INVENTION

Preferred embodiments of the present invention provide a boat propulsion device and a float position determining method wherein a catalyst is prevented from being overheated.

A boat propulsion device according to a preferred embodiment of the present invention is configured to be attachable to a vessel body including an external tank. The boat propulsion device includes an engine, an exhaust pipe, a catalyst, an internal tank, a detection unit and a control unit. The exhaust pipe is connected to the engine. The catalyst is disposed in the exhaust pipe. The internal tank communicates with the external tank. The internal tank is configured to store a fuel to be supplied to the engine. The detection unit is configured to detect whether or not an amount of fuel remaining within the internal tank is less than or equal to a predetermined remaining amount. The control unit is configured or programmed to perform a rotation speed reduction control to reduce a rotation speed of the engine when the detection unit has detected that the amount of fuel remaining within the internal tank had become less than or equal to the predetermined remaining amount. The predetermined remaining amount is an amount of fuel necessary to drive the engine until a temperature of the catalyst becomes lower than an ignition temperature of the fuel under the rotation speed reduction control.

According to various preferred embodiments of the present invention, it is possible to provide a boat propulsion device and a float position determining method wherein a catalyst is prevented from being overheated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

With reference to the drawings, explanation will be hereinafter made for a structure of a boat propulsion device 100 according to preferred embodiments of the present invention.

Figure 1:
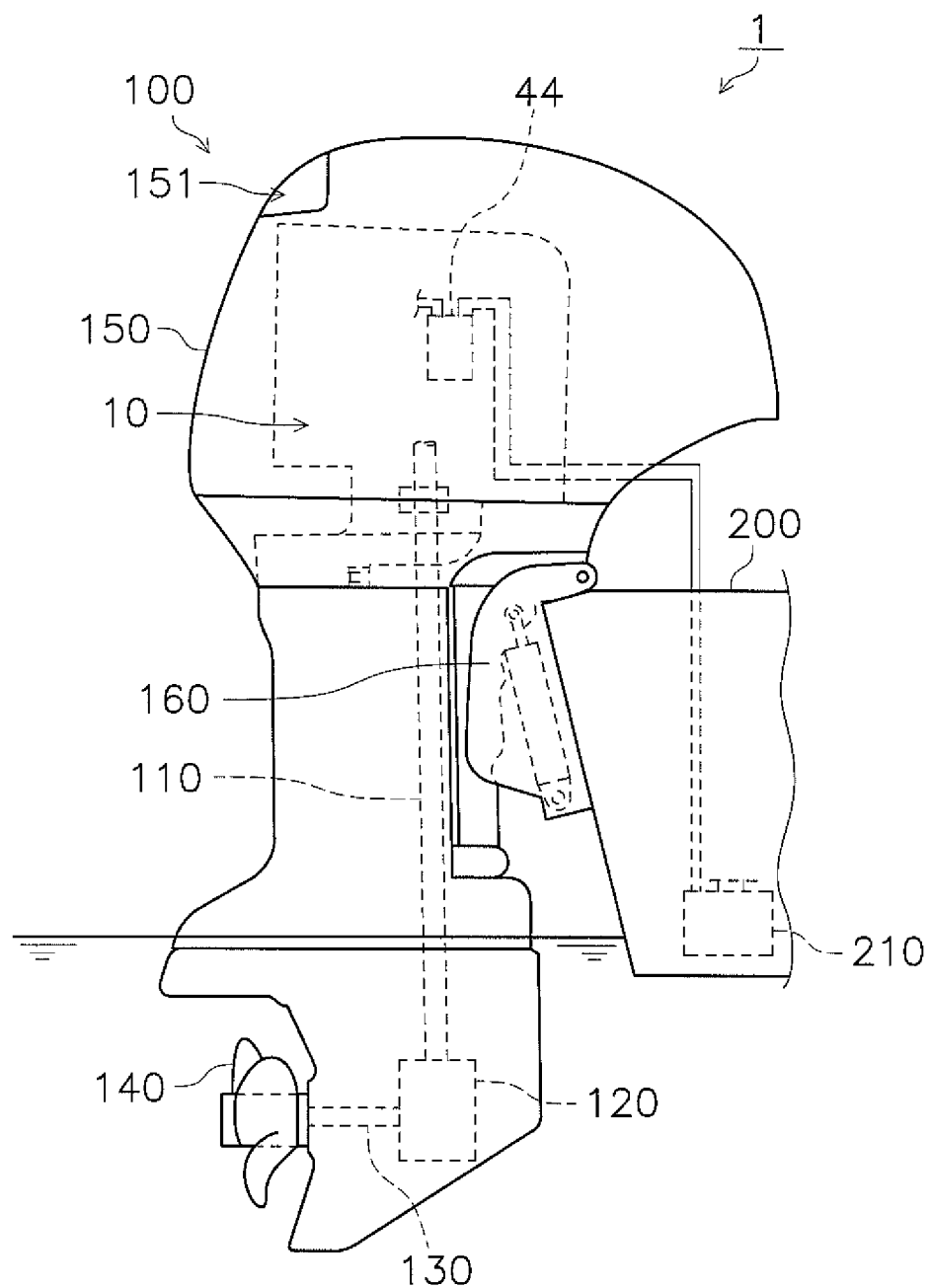
FIG. 1 is a side view of an entire structure of a boat propulsion device.

FIG. 1 is a side view of a structure of a rear end portion of a watercraft 1 and the periphery thereof. The watercraft 1 includes the boat propulsion device 100 and a vessel body 200.

The boat propulsion device 100 is a device configured to propel the vessel body 200. The boat propulsion device 100 is attached to the rear end portion of the vessel body 200. The boat propulsion device 100 includes an engine 10, a drive shaft 110, a shift mechanism 120, a propeller shaft 130, a propeller 140, a cowling 150 and a bracket 160.

The engine 10 is an internal combustion configured to burn a fuel so as to generate driving force. The fuel is configured to be supplied from an external tank 210 disposed in the vessel body 200 to the engine 10 through a vapor separator tank 44 (an exemplary internal tank). Explanation will be made below for the internal structure of the boat propulsion device 100.

The drive shaft 110 is coupled to the engine 10, and is configured to be rotated by the driving force of the engine 10. The shift mechanism 120 is disposed between the drive shaft 110 and the propeller shaft 130. The shift mechanism 120 is configured to move to a forward thrust position, a neutral position and a rearward thrust position. The shift mechanism 120 is configured to switch the rotation of the propeller shaft 130 to any of forward thrust rotation, neutral rotation and rearward thrust rotation. The propeller 140 is attached to the rear end portion of the propeller shaft 130.

The cowling 150 accommodates the engine 10, the drive shaft 110 and the shift mechanism 120. A vent hole 151 is bored in the cowling 150 in order to take in air to be supplied to the engine 10.

The bracket 160 is a member configured to couple the boat propulsion device 100 to the vessel body 200. The boat propulsion device 100 is supported by the bracket 160 so as to be capable of tilting back and forth.

Figure 2:
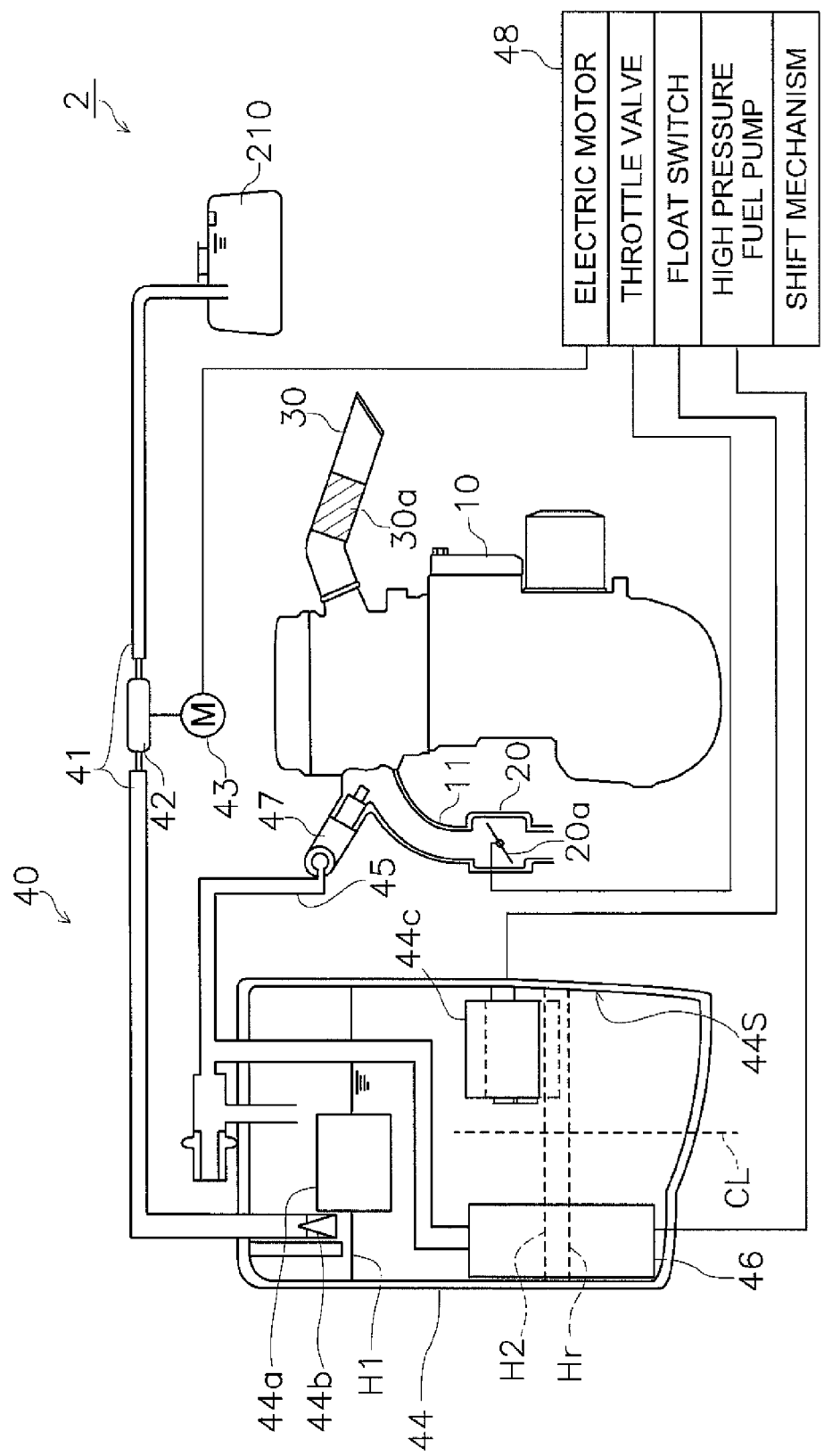
FIG. 2 is a schematic diagram illustrating a structure of a fuel system.

Next, with reference to the drawings, explanation will be made for an internal structure of the boat propulsion device 100. FIG. 2 is a schematic diagram illustrating the internal structure of the boat propulsion device 100.

The boat propulsion device 100 includes an intake pipe 11, a throttle body 20, an exhaust pipe 30 and a fuel supply device 40.

The intake pipe 11 is a pipe through which a mixed gas to be supplied to the engine 10 flows. The throttle body 20 is coupled to the intake pipe 11. The throttle body 20 includes a throttle valve 20a which is configured to regulate the flow rate of air to be supplied to the engine 10. In a normal operation, an opening degree S (e.g., an angle or an opening area) of the throttle valve 20a is regulated in response to a throttle operation by an operator.

The exhaust pipe 30 is a pipe configured to discharge exhaust gas from the engine 10 into water. The exhaust pipe 30 accommodates a catalyst 30a. The catalyst 30a preferably is, for instance, a three-way catalyst. The three-way catalyst is a type of catalyst that simultaneously purifies three kinds of compounds contained in the exhaust gas (i.e., hydrocarbon, nitrogen oxide and carbon monoxide) when the fuel is burnt at around a theoretical air-fuel ratio. The catalyst 30a is heated to a high temperature in driving the engine 10. Therefore, as described below, a rotation speed reduction control is performed to prevent a situation that the fuel, leaking out in a misfire of the engine 10, ignites by making contact with the catalyst 30a. The rotation speed reduction control is intended to reduce the temperature of the catalyst 30a to be lower than the ignition temperature of the fuel by the time when the misfire of the engine 10 is caused.

The fuel supply device 40 is configured to supply the fuel from the external tank 210 to the engine 10. As represented in FIG. 2, the fuel supply device 40 includes a first piping 41 (an exemplary piping), a low pressure fuel pump 42, an electric motor 43, the vapor separator tank 44 (an exemplary internal tank), a second piping 45, a high pressure fuel pump 46, an injector 47 and an ECU (Engine Control Unit) 48.

The first piping 41 communicates between the external tank 210 and the vapor separator tank 44. The tip end of the first piping 41 is disposed within the vapor separator tank 44. The low pressure fuel pump 42 is disposed in an intermediate portion of the first piping 41. The low pressure fuel pump 42 is configured to feed the fuel from the external tank 210 to the vapor separator tank 44 at a predetermined pressure. The low pressure fuel pump 42 is configured to be driven by the electric motor 43.

The vapor separator tank 44 stores the fuel to be supplied to the engine 10. The vapor separator tank 44 is connected to the first piping 41 and the second piping 45. The fuel is fed to the vapor separator tank 44 from the external tank 210 through the first piping 41. The vapor separator tank 44 is configured to separate a vaporized fuel and a liquid fuel from each other.

A float 44a, a needle valve 44b (an exemplary valve) and a float switch 44c (an exemplary detection unit) are disposed within the vapor separator tank 44.

The float 44a floats on the liquid surface of the fuel. The float 44a is attached to the needle valve 44b. The needle valve 44b is attached to an opening of the first piping 41 and is configured to open or close the opening. When the liquid surface of the fuel becomes lower than a first liquid surface height H1, the needle valve 44b is downwardly pulled by the float 44a and is set in an opened state. Accordingly, the fuel flows into the vapor separator tank 44 from the first piping 41. When the liquid surface of the fuel subsequently reaches the first liquid surface height H1, the needle valve 44b is upwardly pushed by the float 44a and is set in a closed state. Accordingly, the fuel stops flowing into the vapor separator tank 44 from the first piping 41. Thus, the amount of the fuel to be stored in the vapor separator tank 44 is maintained constant. It should be noted that the needle valve 44b keeps the opened state when the fuel does not flow into the vapor separator tank 44 from the first piping 41.

The float switch 44c is disposed in a position lower than the float 44a. The float switch 44c is mounted so as to be movable up and down in a predetermined range (of e.g., roughly several cm). When the liquid surface of the fuel becomes less than or equal to a second liquid surface height H2, the float switch 44c is lowered to a lower limit position (an exemplary detection position; see a dashed line in FIG. 2) and is changed into an on-state. Thus, the float switch 44c detects that a fuel amount V in the vapor separator tank 44 has become less than or equal to a predetermined remaining amount Vp. When the liquid surface of the fuel becomes higher than the second liquid surface height H2, the float switch 44c is elevated from the lower limit position and is changed into an off-state. Thus, the float switch 44c detects that the fuel amount V has become greater than the predetermined remaining amount Vp. The predetermined remaining amount Vp is a fuel amount that enables the engine 10 to be driven until the temperature of the catalyst 30a becomes lower than the ignition temperature of the fuel under the rotation speed reduction control to be described. Explanation will be made below for a method of determining the detection position of the float switch 44c.

The float switch 44c is herein preferably disposed in a position that the float switch 44c is less affected by variation in posture of the boat propulsion device 100. Therefore, the float switch 44c is preferably disposed closer to the vessel body 200 with reference to a center line CL of the vapor separator tank 44 in the back-and-forth direction. Specifically, in the present exemplary preferred embodiment, the float switch 44c is attached to a front lateral surface 44S closest to the vessel body 200 among the inner lateral surfaces of the vapor separator tank 44. Accordingly, a variation range of the liquid surface height is narrowed when the boat propulsion device 100 is tilted. Thus, erroneous detection by the float switch 44c is prevented.

The second piping 45 communicates between the high pressure fuel pump 46 and the injector 47. The high pressure fuel pump 46 is configured to feed the fuel from the vapor separator tank 44 to the injector 47 through the second piping 45 at a predetermined pressure. The high pressure fuel pump 46 is coupled to the tip end of the second piping 45, while being disposed inside the vapor separator tank 44. It should be noted that the high pressure fuel pump 46 may be disposed in an intermediate portion of the second piping 45, while being disposed outside the vapor separator tank 44.

The injector 47 is connected to the tip end of the second piping 45. The injector 47 is configured to inject the fuel, fed thereto from the vapor separator tank 44, into the intake pipe 11 at a predetermined timing.

The ECU 48 is electrically connected to the electric motor 43, the high pressure fuel pump 46, the float switch 44c, the throttle valve 20a and the shift mechanism 120.

The ECU 48 is configured or programmed to control the electric motor 43 to cause it to feed the fuel from the external tank 210 to the vapor separator tank 44. The ECU 48 controls the high pressure fuel pump 46 to cause it feed the fuel from the vapor separator tank 44 to the injector 47.

The ECU 48 is configured to perform the rotation speed reduction control of reducing the rotation speed of the engine 10 when the float switch 44c detects that the fuel amount V is less than or equal to the predetermined remaining amount Vp. It should be noted that the ECU 48 preferably starts performing the rotation speed reduction control when a state that the fuel amount V is less than or equal to the predetermined remaining amount Vp (i.e., the on-state of the float switch 44c) continues for a stand-by period D3 (see FIG. 4). With the stand-by period D3 thus set, the rotation speed reduction control is configured not to be started while the liquid surface ripples and the float switch 44c is turned on and off in an oscillatory manner. Therefore, the rotation speed reduction control is stably performed. For example, the stand-by period D3 preferably is set to be two to three seconds. However, the stand-by period D3 is not limited to this.

When the rotation speed of the engine 10 is greater than a predetermined speed Rp at a time of starting the rotation speed reduction control, the ECU 48 is configured to gradually reduce the opening degree S of the throttle valve 20a to a predetermined opening degree Sp so as to reduce the rotation speed of the engine 10 to the predetermined speed Rp. The predetermined speed Rp is less than the maximum rotation speed $R_{MAX}$ of the engine 10. The predetermined speed Rp may be equal to or different from an idle rotation speed of the engine 10. When the predetermined speed Rp is set to be greater than the idle rotation speed, the vessel body 200 can be navigated at a low speed even under the rotation speed reduction control.

Under the rotation speed reduction control, the ECU 48 is configured to limit the rotation speed of the engine 10 to be less than or equal to the predetermined speed Rp. When the rotation speed of the engine 10 is less than the predetermined speed Rp, the ECU 48 is configured to regulate the opening degree S of the throttle valve 20a in response to a throttle operation by an operator. When the rotation speed of the engine 10 is increased to the predetermined speed Rp, the ECU 48 is configured to fix the opening degree S of the throttle valve 20a to the predetermined opening degree Sp regardless of the throttle operation by the operator.

The ECU 48 is configured to terminate the rotation speed reduction control when the float switch 44c (the detection unit) detects that the fuel amount V has become greater than the predetermined remaining amount Vp while the shift mechanism 120 has moved to the neutral position. By thus setting the fact that the shift mechanism 120 has moved to the neutral position as a condition for terminating the rotation speed reduction control, it is possible to prevent the vessel body 200 from being inevitably accelerated simultaneously with the termination of the rotation speed reduction control.

Figure 3:
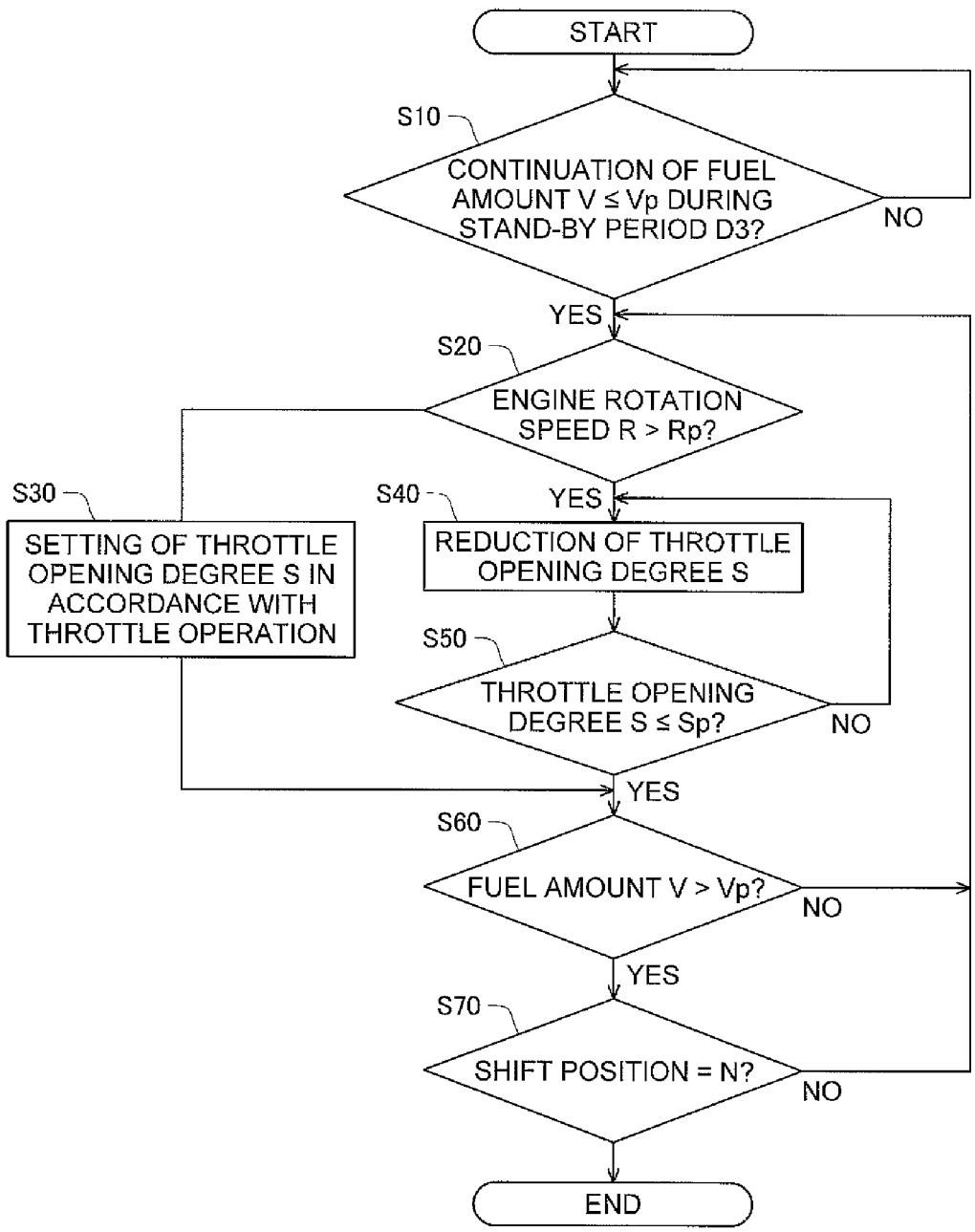
FIG. 3 is a flowchart for explaining a rotation speed reduction control.

Next, explanation will be made for the rotation speed reduction control of the ECU 48 with reference to the drawings. FIG. 3 is a flowchart for explaining the rotation speed reduction control.

Figure 4:
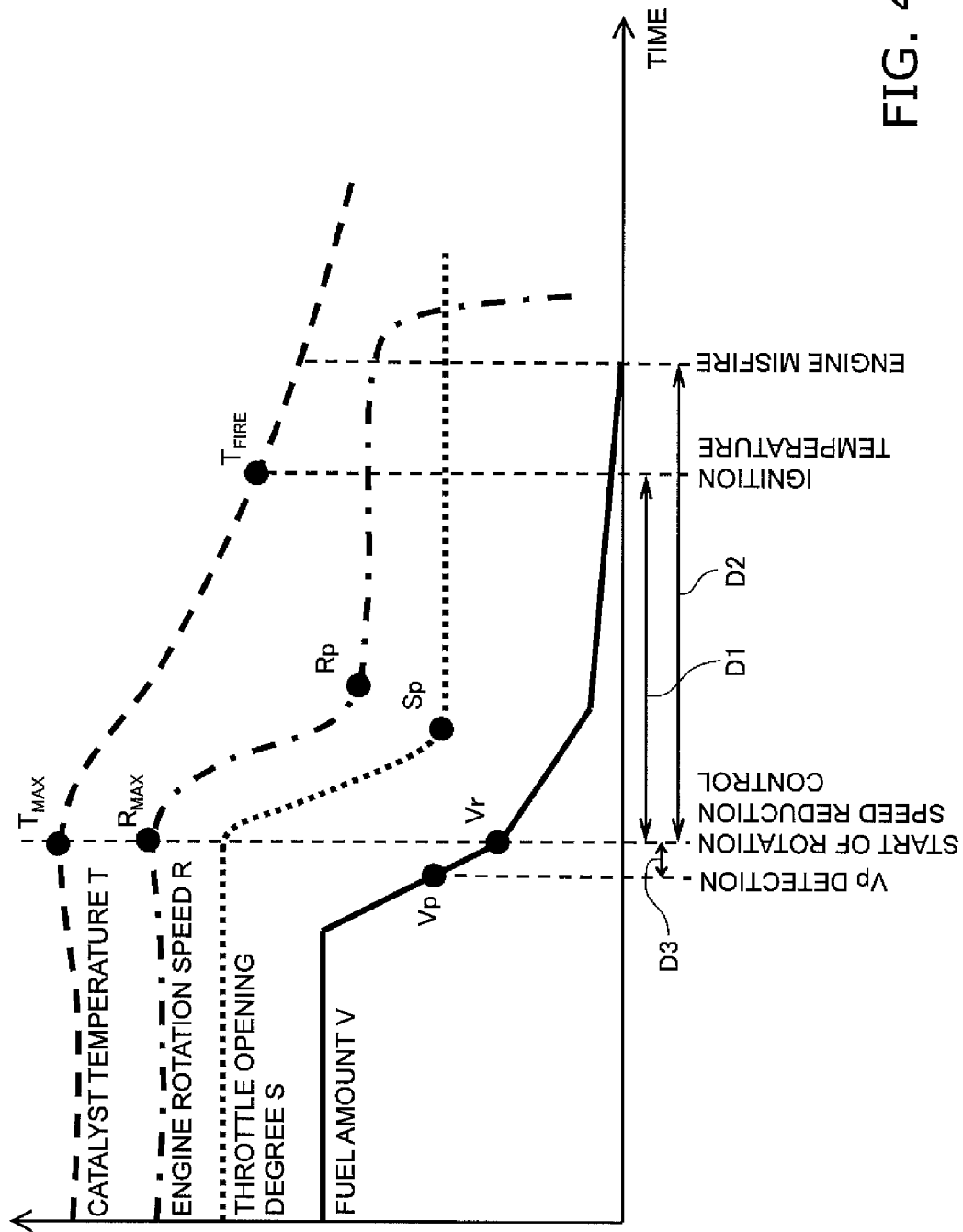
FIG. 4 is a chart representing exemplary transitions of respective parameters before and after activation of the rotation speed reduction control.

In Step S10, the ECU 48 determines whether or not the state that the fuel amount V is less than or equal to the predetermined remaining amount Vp has continued for the stand-by period D3 (see FIG. 4). The processing proceeds to Step S20 when the state that the fuel amount V is less than or equal to the predetermined remaining amount Vp has continued for the stand-by period D3. By contrast, the ECU 48 repeats the processing of Step S10 when the state that the fuel amount V is less than or equal to the predetermined remaining amount Vp has not continued for the stand-by period D3.

In Step S20, the ECU 48 determines whether or not the rotation speed of the engine 10 is greater than the predetermined speed Rp. The processing proceeds to Step S30 when the rotation speed of the engine 10 is not greater than the predetermined speed Rp. By contrast, the processing proceeds to Step S40 when the rotation speed of the engine 10 is greater than the predetermined speed Rp.

In Step S30, the ECU 48 regulates the opening degree S of the throttle valve 20a in response to a throttle operation by an operator. Thereafter, the processing proceeds to Step S60.

In Step S40, the ECU 48 gradually reduces the opening degree S of the throttle valve 20a.

In Step S50, the ECU 48 determines whether or not the opening degree S of the throttle valve 20a has become less than or equal to the predetermined opening degree Sp. The processing returns to Step S40 when the opening degree S has not become less than or equal to the predetermined opening degree Sp. By contrast, the processing proceeds to Step S60 when the opening degree S has become less than or equal to the predetermined opening degree Sp.

In Step S60, the ECU 48 determines whether or not the fuel amount V has become greater than the predetermined remaining amount Vp. The processing proceeds to Step S70 when the fuel amount V has become greater than the predetermined remaining amount Vp. The processing returns to Step S20 when the fuel amount V has not become greater than the predetermined remaining amount Vp.

In Step S70, the ECU 48 determines whether or not the shift mechanism 120 has moved to the neutral position. The ECU 48 terminates the rotation speed reduction control when the shift mechanism 120 has moved to the neutral position. By contrast, the processing returns to Step S20 when the shift mechanism 120 has not moved to the neutral position.

As described above, when the fuel amount V has become less than or equal to the fuel remaining amount Vp, the control of inhibiting increase in the engine rotation speed R is continued until the conditions of Steps S60 and S70, which are conditions of terminating the rotation speed reduction control, are satisfied. Accordingly, the temperature (T) of the catalyst 30a is significantly reduced before a misfire is caused in the engine 10.

Next, explanation will be made for a method of determining the position of the float switch 44c with reference to the drawings. FIG. 4 is a chart representing exemplary transitions of respective parameters before and after activation of the rotation speed reduction control.

First, a temperature reduction period D1 is obtained. The temperature reduction period D1 is a period of time required for the temperature (T) of the catalyst 30a to be reduced from its highest temperature ($T_{MAX}$) to a temperature lower than the ignition temperature ($T_{FIRE}$) of the fuel when the rotation speed (R) of the engine 10 is reduced from its maximum speed ($R_{MAX}$) to the predetermined speed Rp. The temperature reduction period D1 is a value variable in accordance with the specification of the engine 10, the type of the catalyst 30a, and so forth.

Next, a postponement period D2 is set based on the temperature reduction period D1. The postponement period D2 is a period of time ranging from starting of the rotation speed reduction control to occurrence of a misfire of the engine 10. The postponement period D2 is only required to be greater than or equal to the temperature reduction period D1. The chances of an occurrence of an engine misfire are significantly reduced in proportion to increase in the postponement period D2 greater than the temperature reduction period D1.

Next, a reference amount of fuel Vr is obtained. The reference amount of fuel Vr is an amount required to drive the engine 10 for the postponement period D2.

Next, the aforementioned predetermined remaining amount Vp is obtained based on the reference amount of fuel Vr. The predetermined remaining amount Vp is a value obtained by adding the reference amount Vr to an additional amount ΔV required to drive the engine 10 at the maximum speed $R_{MAX}$ for the stand-by period D3.

Next, a reference liquid surface height Hr is obtained. The reference liquid surface height Hr is a liquid surface height of the fuel when the fuel of the predetermined remaining amount Vp is supplied to the vapor separator tank 44.

Next, the detection position of the float switch 44c is determined based on the reference liquid surface height Hr. Specifically, the detection position of the float switch 44c is only required to be determined to make the second liquid surface height H2 (see FIG. 2) greater than or equal to the reference liquid surface height Hr. In the present exemplary preferred embodiment, the lower limit position of the float switch 44c is set as the detection position.

As described above, according to the boat propulsion device 100 of the present exemplary preferred embodiment, the vapor separator tank 44 is enabled to reliably store the predetermined remaining amount Vp of the fuel, which is required to drive the engine 10 until the temperature T of the catalysts 30a becomes lower than the ignition temperature $T_{FIRE}$ of the fuel under the rotation speed reduction control. Therefore, even if the fuel leaks out of the engine 10 to the exhaust pipe 30 in a misfire and makes contact with the catalyst 30a, the fuel does not ignite, and hence, the catalyst 30a is prevented from being damaged or broken.

The present invention has been explained with respect to the aforementioned exemplary preferred embodiment. However, it should not be understood that the present invention is limited by the description and the drawings of this disclosure. A variety of alternative exemplary preferred embodiments, practical examples and operational techniques would be apparent for a person skilled in the art from this disclosure.

In the aforementioned exemplary preferred embodiment, the boat propulsion device 100 preferably is designed to be equipped with the float switch 44c as a detection unit configured to detect whether or not the fuel amount V within the vapor separator tank 44 is less than or equal to the predetermined remaining amount Vp. However, the structure of the boat propulsion device 100 is not limited to this. The boat propulsion device 100 may be equipped with, instead of the flow switch 44c, a fuel pressure sensor (or fuel pressure sensors) configured to detect the pressure of the fuel flowing within either (or both) of the first piping 41 and the second piping 45. In this case, the ECU 48 can estimate that the fuel amount V within the vapor separator tank 44 is less than or equal to the predetermined remaining amount Vp based on the detection value (or values) of either (or both) of the fuel pressure sensors. Further, the boat propulsion device 100 may be equipped with, as a detection unit, a pressure sensor disposed on the bottom surface of the vapor separator tank 44. In this case, the ECU 48 can obtain the fuel amount V to be calculated based on the detection value of the pressure sensor. Further, the boat propulsion device 100 may be equipped with, as a detection unit, a liquid surface level sensor of a light reflection type to detect the liquid surface position of the fuel within the vapor separator tank 44 or an angular meter (e.g., a potentiometer) attached to the shaft of the float 44a.

In the aforementioned exemplary preferred embodiment, the ECU 48 preferably is configured to start the rotation speed reduction control when the state that the fuel amount is less than or equal to the predetermined remaining amount Vp has continued for the stand-by period D3. However, the ECU 48 may be configured to start the rotation speed reduction control when it is detected that the fuel amount becomes less than or equal to the predetermined remaining amount Vp. In this case, when the lower limit position of the float switch 44c is determined, the predetermined remaining amount Vp is not required to be calculated by adding the additional amount ΔV to the reference amount Vr, and the reference liquid surface height Hr may be directly calculated based on the reference amount Vr.

In the aforementioned exemplary preferred embodiment, when the lower limit position of the float switch 44c is determined, the postponement period D2 is set to be greater than or equal to the temperature reduction period D1. However, the postponement period D2 is not necessarily required to be set. In this case, it is only required to obtain, as the reference amount Vr, a fuel amount required to drive the engine 10 for the temperature reduction period D1.

In the aforementioned exemplary preferred embodiment, the low pressure fuel pump 42 is configured to be electrically driven by the electric motor 43. However, the low pressure fuel pump 42 may be configured to be mechanically driven by utilizing power of the engine 10. When the low pressure fuel pump 42 is mechanically driven, for instance, the low pressure fuel pump 42 may be coupled to the cam shaft of the engine 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat propulsion device configured to be attachable to a vessel body having an external tank, the boat propulsion device comprising:
    an engine;
    an exhaust pipe connected to the engine;
    a catalyst disposed in the exhaust pipe;
    an internal tank configured to communicate with the external tank and configured to store a fuel to be supplied to the engine;
    a detection unit configured to detect whether or not an amount of fuel remaining within the internal tank is less than or equal to a predetermined remaining amount; and
    a control unit configured or programmed to perform a rotation speed reduction control to reduce a rotation speed of the engine when the detection unit has detected that the amount of fuel remaining within the internal tank had become less than or equal to the predetermined remaining amount; wherein
    the predetermined remaining amount being an amount of fuel necessary to drive the engine until a temperature of the catalyst becomes lower than an ignition temperature of the fuel under the rotation speed reduction control.

2. The boat propulsion device according to claim 1, wherein
    the control unit is configured to limit the rotation speed of the engine to a predetermined speed or less under the rotation speed reduction control.

3. The boat propulsion device according to claim 1, further comprising:
    a drive shaft coupled to the engine;
    a propeller shaft; and
    a shift mechanism disposed between the drive shaft and the propeller shaft, the shift mechanism being configured to move to a forward thrust position, a neutral position and a rearward thrust position; wherein
    the control unit is configured or programmed to terminate the rotation speed reduction control when the detection unit has detected that the amount of fuel remaining within the internal tank had become greater than the predetermined remaining amount and the shift mechanism has moved to the neutral position.

4. The boat propulsion device according to claim 2, wherein the predetermined speed is less than a rotation speed of the engine just prior to the rotation speed reduction control.

5. The boat propulsion device according to claim 1, further comprising:
    a throttle valve configured to regulate a flow rate of an air to be supplied to the engine; wherein the control unit is configured or programmed to perform the rotation speed reduction control by reducing an opening degree of the throttle valve.

6. The boat propulsion device according to claim 4, wherein the predetermined remaining amount is an amount of fuel necessary to drive the engine until the temperature of the catalyst becomes lower than the ignition temperature of the fuel when the rotation speed of the engine is reduced from a maximum speed to the predetermined speed.

7. The boat propulsion device according to claim 1, wherein the control unit is configured or programmed to perform the rotation speed reduction control when the detection unit has continuously detected through a stand-by period that the amount of fuel remaining within the internal tank had been less than or equal to the predetermined remaining amount.

8. The boat propulsion device according to claim 1, wherein the detection unit is disposed in the internal tank.

9. The boat propulsion device according to claim 8, wherein the detection unit includes a float switch configured to be movable up and down.

10. The boat propulsion device according to claim 8, wherein
the detection unit is disposed closer to the vessel body with respect to a center line of the internal tank in a back-and-forth direction.

11. The boat propulsion device according to claim 8, further comprising:
a piping configured to provide communication between the external tank and the internal tank;
a valve disposed in the internal tank and being configured to open and close an opening of the piping; and
a float attached to the valve; wherein
the detection unit is disposed lower than the float.

12. A float position determining method comprising:
obtaining a temperature reduction period required until a temperature of a catalyst disposed in an exhaust pipe connected to an engine becomes lower than an ignition temperature of a fuel when a rotation speed of the engine is reduced from a maximum speed to a predetermined speed;
obtaining a reference amount of fuel necessary to drive the engine at least through the temperature reduction period;
obtaining a reference liquid surface height when at least the reference amount of the fuel is supplied to an internal tank configured to store the fuel to be supplied to the engine;
determining a detection position of a float switch based on the reference liquid surface height; and
attaching the float switch to the internal tank at the detection position; wherein
the float switch is configured to be movable up and down in the internal tank.

* * * * *